US007008188B2

(12) United States Patent
Booe, Jr.

(10) Patent No.: US 7,008,188 B2
(45) Date of Patent: Mar. 7, 2006

(54) SHOCK-ABSORBING PROPELLER ASSEMBLY

(75) Inventor: James M. Booe, Jr., Indianapolis, IN (US)

(73) Assignee: Precision Propeller, Inc., Indianapolis, IN (US)

(*) Notice: Subject to any disclaimer, the term of this patent is extended or adjusted under 35 U.S.C. 154(b) by 59 days.

(21) Appl. No.: 10/688,335

(22) Filed: Oct. 17, 2003

(65) Prior Publication Data

US 2005/0084374 A1    Apr. 21, 2005

(51) Int. Cl.
*B63H 1/20*    (2006.01)
(52) U.S. Cl. ............................... 416/134 R; 416/244 B
(58) Field of Classification Search .............. 416/93 A, 416/2, 135, 204 R, 244 B, 134 R
See application file for complete search history.

(56) References Cited

U.S. PATENT DOCUMENTS

| 4,566,855 | A | 1/1986 | Costabile et al. |
| 4,642,057 | A | 2/1987 | Frazzell et al. |
| 4,842,483 | A | 6/1989 | Geary |
| 5,049,034 | A | 9/1991 | Cahoon |
| 5,908,284 | A | 6/1999 | Lin |
| 5,967,751 | A | 10/1999 | Chen |
| 6,358,008 | B1 | 3/2002 | Chen ...................... 416/134 R |
| 6,471,481 | B1 | 10/2002 | Chen |
| 6,524,069 | B1 | 2/2003 | Chen |
| 6,685,432 | B1 | 2/2004 | Chen ...................... 416/134 R |
| 2002/0085914 | A1* | 7/2002 | Chen ...................... 416/134 R |
| 2003/0021691 | A1* | 1/2003 | Powers ................... 416/244 B |

* cited by examiner

*Primary Examiner*—Thomas E. Lazo
*Assistant Examiner*—Richard A. Edgar
(74) *Attorney, Agent, or Firm*—Barnes & Thornburg LLP

(57) ABSTRACT

A method and apparatus is disclosed for connecting a drive axle to a propeller. A drive member is configured to mount on a drive axle, a tubular member is coupled to the propeller, and a resilient members is configured to be positioned between the drive member and the tubular member. The drive member has an axis and includes a plurality of radially outwardly extending ribs. The tubular member is coupled to the propeller and has an axis and a plurality of radially inwardly extending ribs. The resilient members has an axis and is configured to be positioned between the outwardly extending ribs and the inwardly extending ribs. Furthermore, the resilient members is mounted coaxially with the drive member and the tubular member.

21 Claims, 19 Drawing Sheets

SHOCK-ABSORBING PROPELLER ASSEMBLY

BACKGROUND OF THE INVENTION

The present invention relates to a marine propeller, and particularly, to an arrangement and method for mounting a marine propeller on a propeller shaft. More particularly, the present invention relates to a shock absorbing system for a marine propeller that is mounted on a propeller shaft.

SUMMARY OF THE INVENTION

An assembly for connecting a propeller to a drive axle comprises one or more of the following elements or combinations thereof. A drive member is configured to mount on the drive axle, a tubular member is coupled to the propeller, and resilient members are configured to be positioned between the drive member and the tubular member. The drive member has an axis and includes a plurality of radially outwardly extending ribs. The tubular member is coupled to the propeller and has an axis and a plurality of radially inwardly extending ribs. The resilient members are configured to be positioned between the outwardly extending ribs and the inwardly extending ribs.

According to the disclosure, the resilient members are formed to deflect under torsion delivered by either the propeller or the drive member. The resilient members also permit limited movement of the propeller relative to the drive member.

The resilient members may have circular cross-sections, or may have polygonal cross-sections. Two or more resilient members may also be joined together by a looped portion having appendages. The appendages each have a length approximately equal to the axial length of the inwardly extending ribs. Furthermore, the looped portions may have rounded corners or squared corners.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
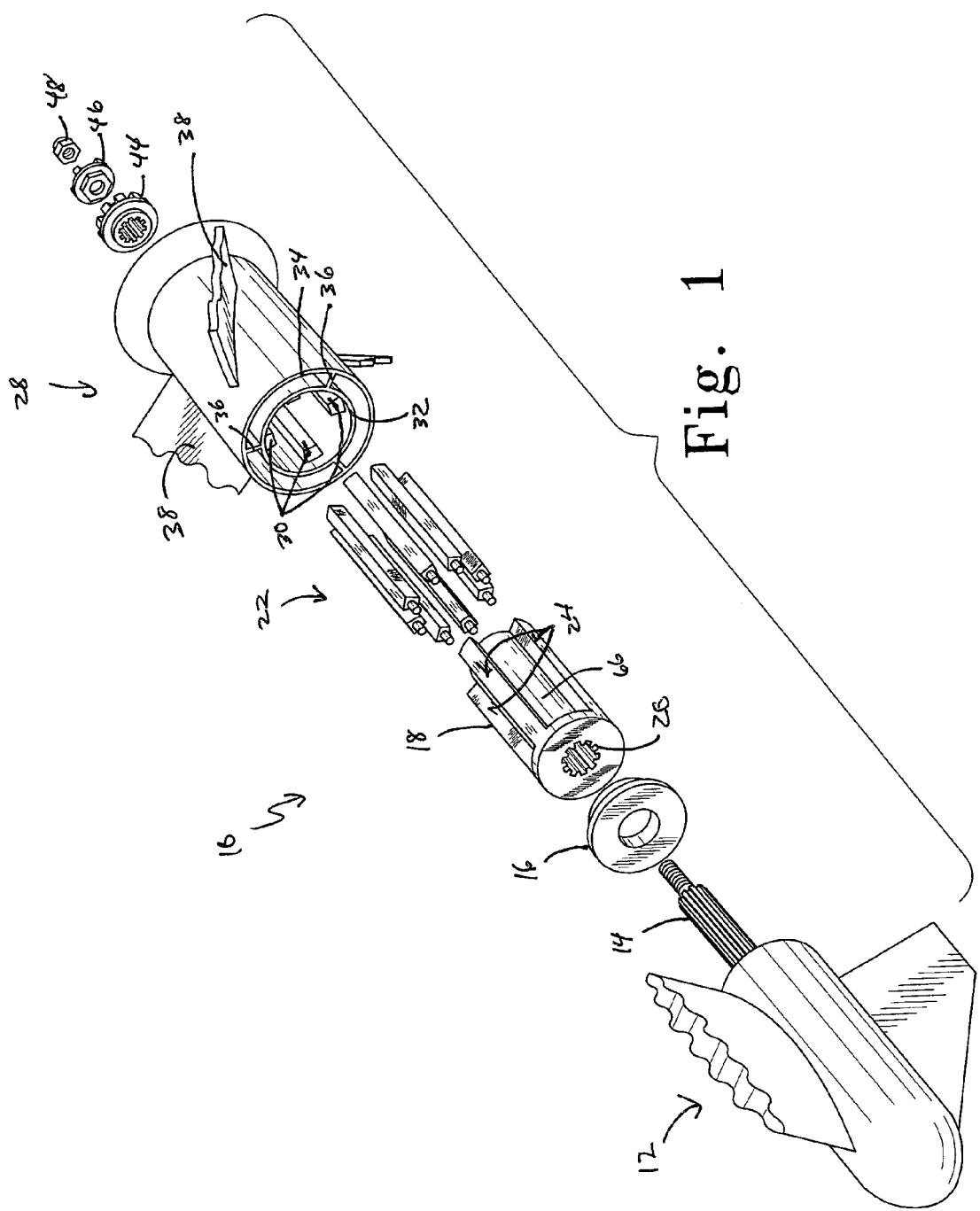
FIG. 1 is an exploded view of a propeller assembly constructed according to one embodiment of the present disclosure, the propeller assembly having a plurality of resilient members being configured for insertion between a drive member and a propeller.

Propeller assembly 10 comprises an outboard lower drive unit 12 from which a splined propeller shaft 14 extends, as shown in FIG. 1. Propeller shaft 14 is operatively connected to a power source, such as a motor (not shown), which causes shaft 14 to rotate about its axis, thereby applying propulsive power to the propeller 28.

In the illustrative embodiment shown in FIG. 1, washer 16 is positioned concentrically on propeller shaft 14 and adjacent lower drive unit 12. A drive member 18 having a splined central bore 20 is positioned adjacent washer 16, and a plurality of resilient members 22 are positioned between drive member 18 and inner hub 32 of propeller 28. Illustratively, drive member 18 is formed to include four radially outwardly and longitudinally extending ribs 24. Similarly, propeller 28 is configured to have four radially inwardly and longitudinally extending ribs 30 fixed to its inner hub 32. It should be understood, however, that this disclosure contemplates the use of any number of radially outwardly extending ribs 24 and radially inwardly extending ribs 30.

Figure 4:
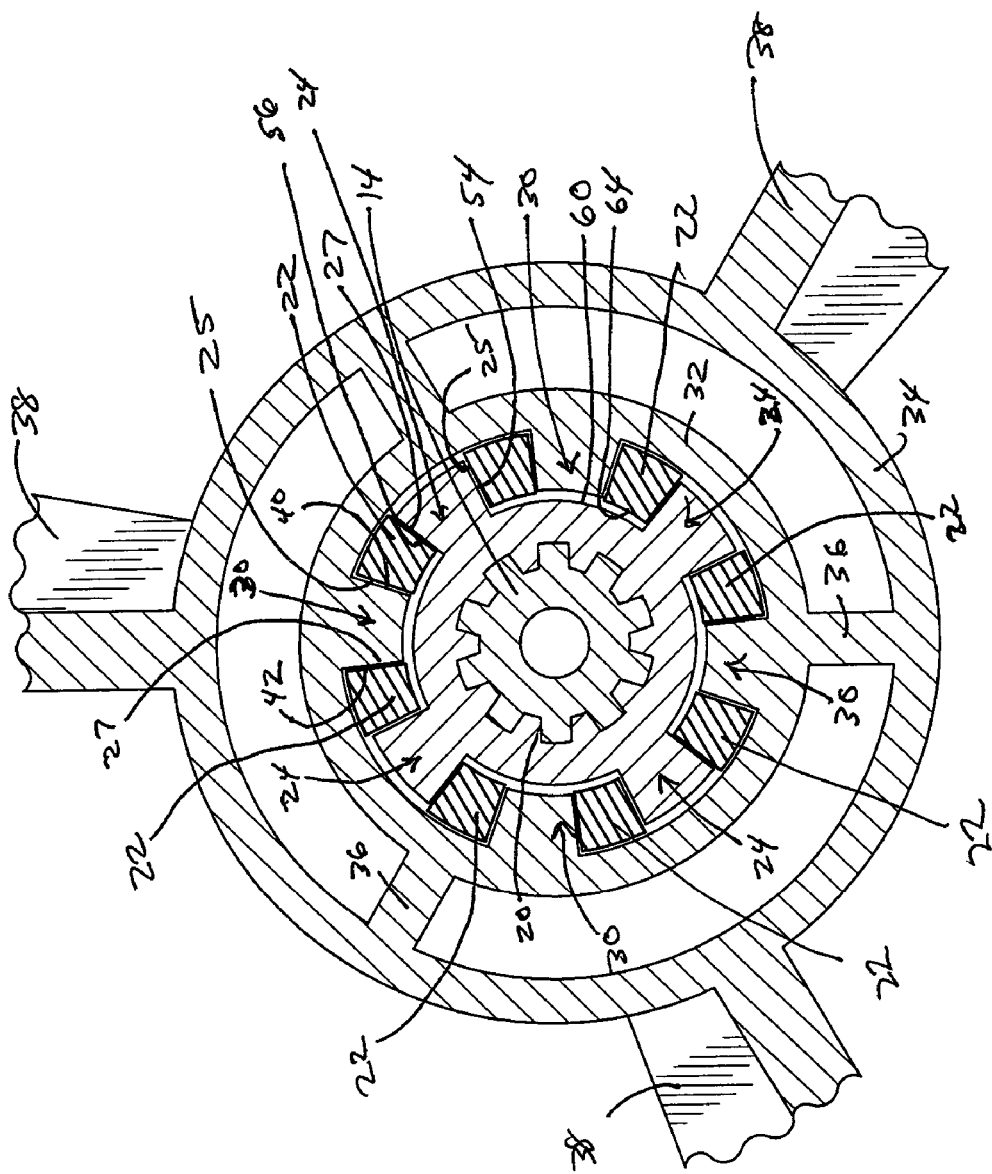
FIG. 4 is a cross-sectional view of the assembled propeller, the cross-section being taken such that one is looking toward the bow of the boat, the view showing the resilient members positioned between the drive member and the inner hub of the propeller.
Figure 5:
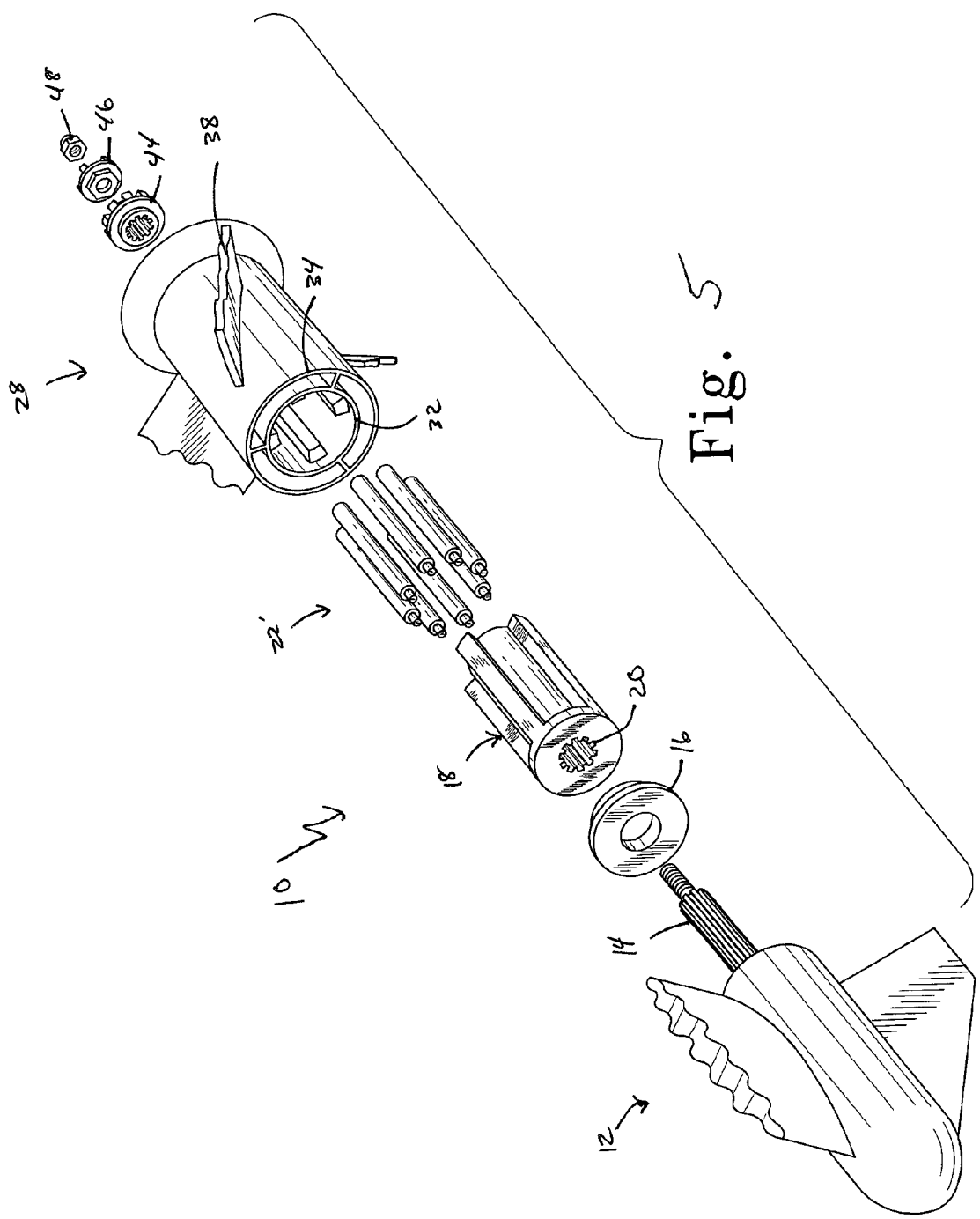
FIG. 5 is an exploded view of a propeller assembly similar to that of FIG. 1, showing another embodiment of the present disclosure.

Resilient members 22 are configured to be positioned between radially outwardly extending ribs 24 and radially inwardly extending ribs 30, as can be viewed in cross-sectional view in FIG. 4. As can further be seen in FIG. 4, the cross section of resilient members 22 is illustratively four-sided, and has two side surfaces 25, 27 that are in alignment with a radially extending plane relative to propeller shaft 14. Illustratively, side surface 25 (also a counter-drive surface) faces in a counter-clockwise direction in FIG. 4, and side surface 27 (a drive surface) faces in a clockwise direction. Radially inwardly extending ribs 30 and radially outwardly extending ribs 24 also have side walls in contact with side surfaces 25, 27 of resilient members 22, and such side walls of ribs 24, 30 are similarly in alignment with radially extending planes relative to propeller shaft 14, as can be seen in FIG. 4.

Illustratively, drive surface or side surface 27, is the side of resilient member 22 that delivers torque or drive force to inwardly extending ribs 30 when propeller assembly 10 is in the forward drive mode. Counter-drive surface, or side surface 25, is illustratively the side of resilient member 22 that delivers torque or reverse drive force to inwardly extending ribs 30 when propeller assembly 10 is in the reverse mode.

Ribs 24 each illustratively include contact surfaces, including a first side wall 54 configured to engage side surface 25 of a resilient member 22, and a second side wall 56 configured to engage side surface 27 of another resilient member 22. Similarly, ribs 30 each include a first side wall 40 configured to engage side surface 25 of a resilient member 22, and a second side wall 42 configured to engage side surface 27 of another resilient member 22, as can be seen in FIG. 4. Ribs 24 each also include an end wall 58, as can be seen in FIG. 3.

Figure 2:
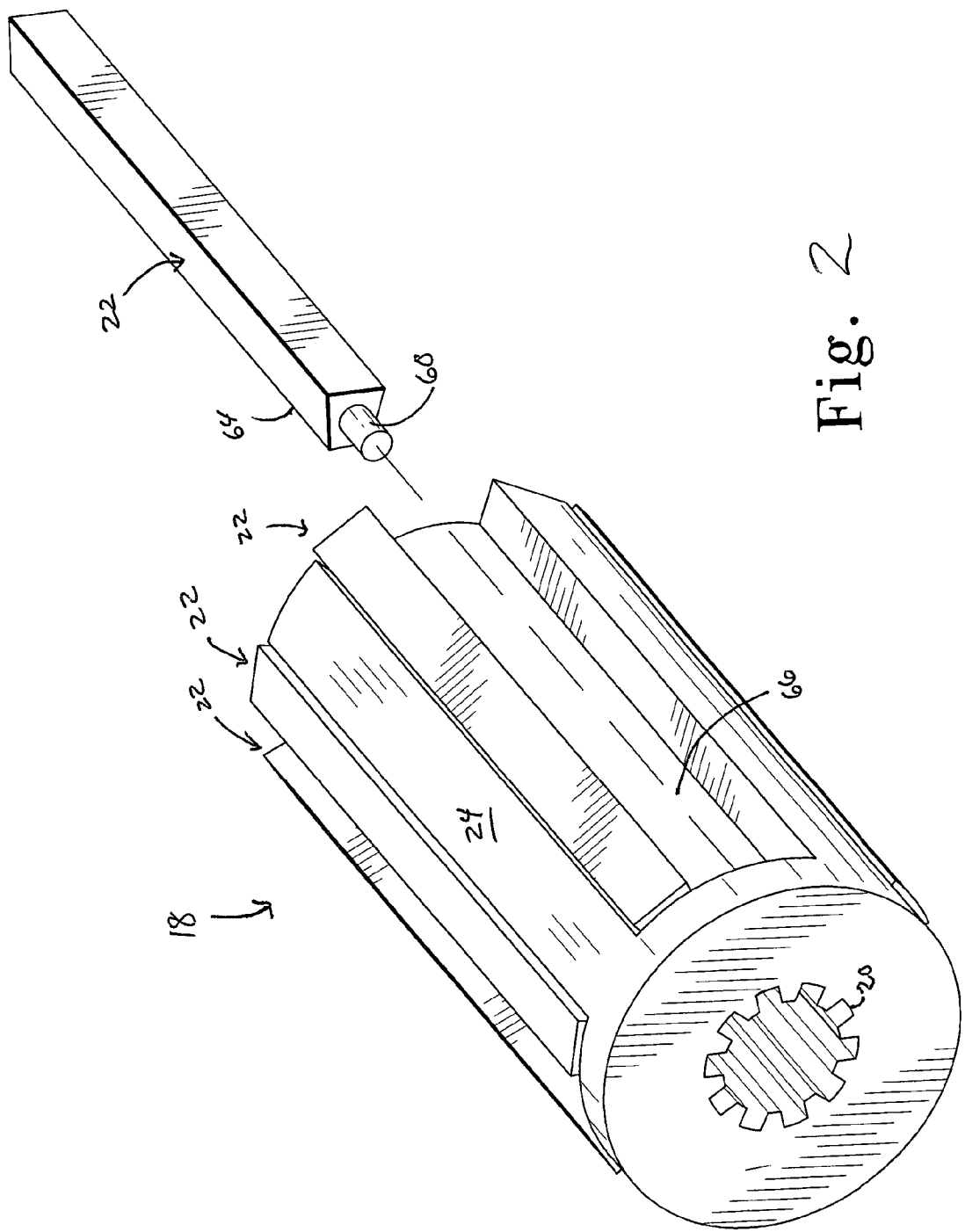
FIG. 2 is a perspective view of the resilient members of FIG. 1 being positioned on the drive member.
Figure 3:
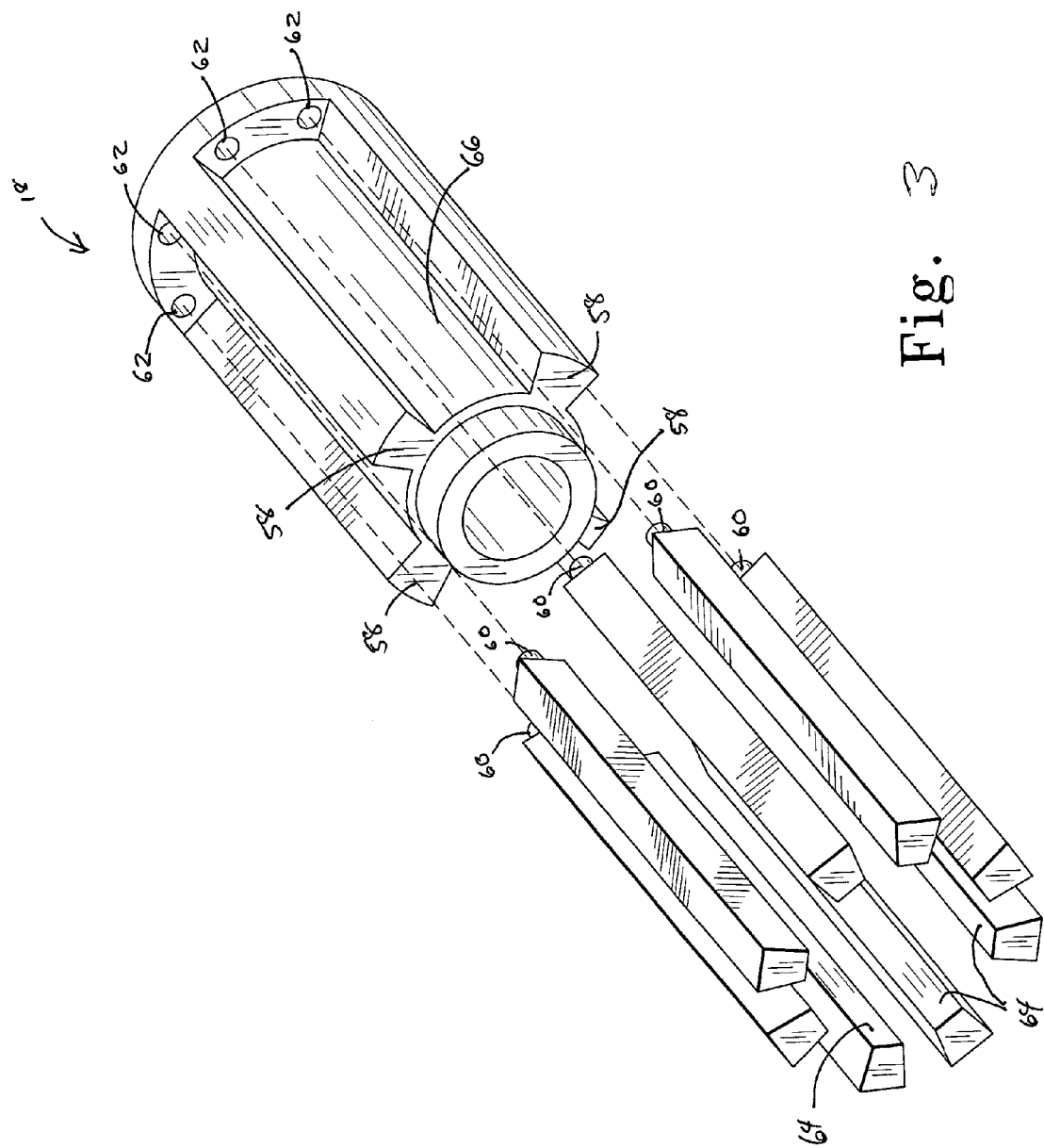
FIG. 3 is an exploded view of the resilient members and drive member shown in FIGS. 1–2, viewed from an angle that shows the cavities formed in the drive member for receiving the bosses of the resilient members.

Resilient members 22 are elongated, as can be seen in FIG. 2, and each resilient member 22 illustratively has a cylindrical boss 60 extending from an end of resilient member 22, the boss 60 being configured to be inserted in cylindrical cavities 62 formed in drive member 18, as can be seen in FIG. 3 (showing drive member 18 from an opposite angle as that shown in FIG. 2).

Resilient members 22 are illustratively molded from a urethane or rubber material, but may be constructed from any pliable or resilient material known in the art, such as a polymer or plastic. In the illustrative embodiment, the rubber is formulated to have a hardness in the range of, but not limited to, 30 to 100 durometer on the Shore A-scale. Resilient members 22 are illustratively shown to have a polygon cross-section as described above and shown in FIGS. 3–4. However, it is within the scope of the disclosure to form resilient members such that the cross section resembles nearly any shape, including a square, triangle, cylinder, or oval. Resilient members 22 may also include rounded edges.

Illustratively, propeller assembly 10 is assembled in the following manner. Bosses 60 of resilient members 22 are inserted in cavities 62 formed in drive member 18, as shown in FIG. 3. Resilient members 22 are illustratively oriented such that the smallest-dimensioned cross-sectional surface 64 of the polygon is positioned to face radially inwardly, toward a radially outwardly facing surface 66 of drive member 18, as can be seen in FIGS. 3–4.

While bosses 60 provide a manner of holding resilient members 22 in place during assembly of propeller assembly 10, it should be understood that other configurations are within the scope of the disclosure. For example, an elastomeric band may be positioned to circumscribe resilient members 22 and drive member 18, such that the elastomeric band is pushed off of resilient member 22 and drive member 18 as drive member 18 mates with inner hub 32 of propeller 28 (not shown).

As illustratively shown in FIGS. 1 and 4, propeller 28 is configured to have four radially inwardly and longitudinally extending ribs 30 fixed to its inner hub 32. It is contemplated, however, that any number of inwardly extending ribs 30 is within the scope of this disclosure. Inner hub 32 and outer hub 34 are illustratively connected with spokes 36, as can be seen in FIG. 4. Outer hub 34 carries propeller blades 38. When propeller 28 is mounted on drive member 18 with resilient members 22 positioned therebetween, each rib 30 of propeller 28 is interposed between two drive member ribs 24. In the illustrative embodiment, a resilient member 22 passes between each propeller rib 30 and drive member rib 24, as can be further understood by referencing the cross-sectional view shown in FIG. 4.

Propeller 28 is secured to the propeller assembly in any manner known in the art, and is illustratively secured with splined washer 44, nut washer 46, and nut 48.

It should be understood that while the illustrated embodiment discloses an assembly order as shown in FIG. 1, wherein drive member 18 and resilient members 22 are inserted into propeller 28 from the bow end 50 of propeller 28, it is within the scope of the disclosure to modify the alignment and assembly order of drive member 18 and resilient members 22 such that they are inserted into the stern end 52 of propeller 28.

In the cross-sectional view shown in FIG. 4, the propeller assembly 10 is fully assembled in the order shown in FIG. 1, illustrating propeller 28 coupled through the various components to propeller shaft 14. Drive member 18 is concentrically mounted on propeller shaft 14 such that splines on propeller shaft 14 are interlocked with splined central bore 20 of drive member 18. Resilient members 22 are positioned over drive member 18 as shown in FIG. 2, and propeller 28 is slidably inserted over resilient members 22 and drive member 18, thereby resulting in a resilient member 22 being interposed between each propeller rib 30 and corresponding drive member rib 24. Illustratively, there exist twice the number of resilient members 22 as propeller ribs 30 or drive member ribs 24.

As illustratively shown in FIG. 4, drive member 18 and drive member ribs 24 are formed such that a small clearance is provided between ribs 24 and inner hub 32 when propeller assembly 10 is assembled. Similarly, propeller ribs 30 are formed such that a small clearance is provided between ribs 30 and drive member 18. However, it is within the scope of the disclosure to have either of propeller ribs 30 or drive member ribs 24, or both, in direct contact with drive member 18 or inner hub 32, respectively. Direct contact between ribs 30 and drive member 18 or ribs 24 and inner hub 32 ensures the centering of propeller 28 on drive member 28.

Driving force, or torque, is transferred from drive member 18 through drive member ribs 24 to resilient members 22. In turn, resilient members 22 transfer the driving force to propeller ribs 30. Resilient members 22 are flexible and capable of absorbing compressive forces, thereby preventing damage that may otherwise result to various components when a driving force is directly transferred without absorptive resilient members 22. Under extreme forces, resilient members 22 may even shear or fail in some manner.

In such a case, temporary or emergency use of propeller assembly 10 is still possible because propeller ribs 30 and drive member ribs 24 can directly contact each other. Such a configuration allows the propeller assembly 10 to be operated even at high speeds after a failure of resilient members, thereby allowing an operator to return to shore at faster than idle speeds. However, in such a scenario, the shock absorption qualities provided by resilient members 22 would be diminished.

During normal operation, forces that may be encountered by propeller 28 are absorbed by resilient members 22. For example, if propeller 28 were to contact an object which would temporarily cause propeller 28 to hesitate, the resulting forces would be absorbed at least partially by resilient members 22 instead of being completely transferred to drive member 18 and other propeller assembly 10 components. The absorption of these forces by resilient members 22 can prevent permanent damage to components which make up propeller assembly 10 and even prevent damage to the motor which drives propeller shaft 14.

The present disclosure also contemplates and accommodates the forces that result from the shifting of gears. In larger boats with larger motors and/or larger propeller assemblies, the shifting of gears in the boat introduces forces or a shock to the propeller assembly 10 which could be damaging to any number of components. Resilient members 22 help to absorb such forces, thereby preventing damage.

Figure 6:
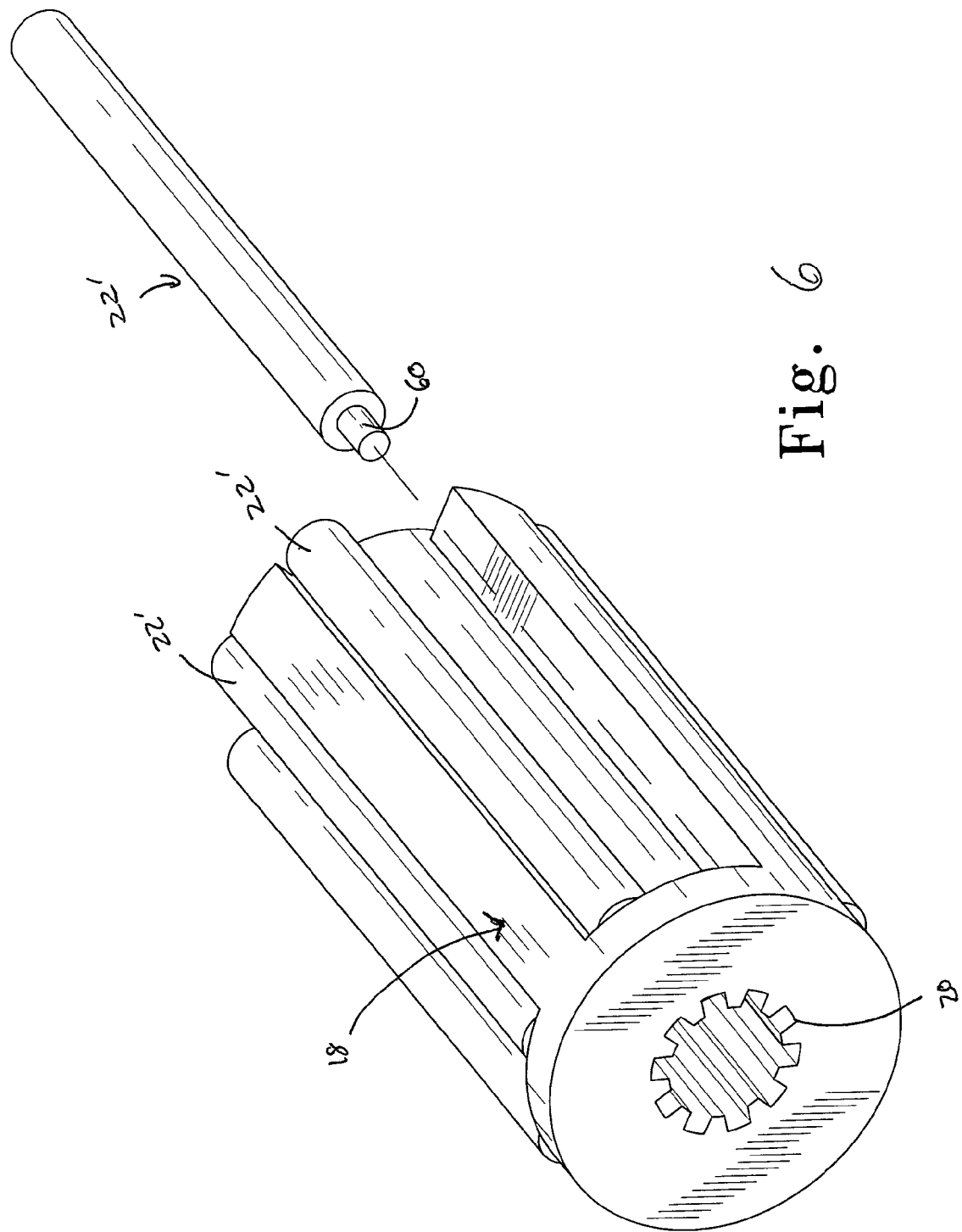
FIG. 6 is a perspective view of the resilient members and drive member of FIG. 5.
Figure 7:
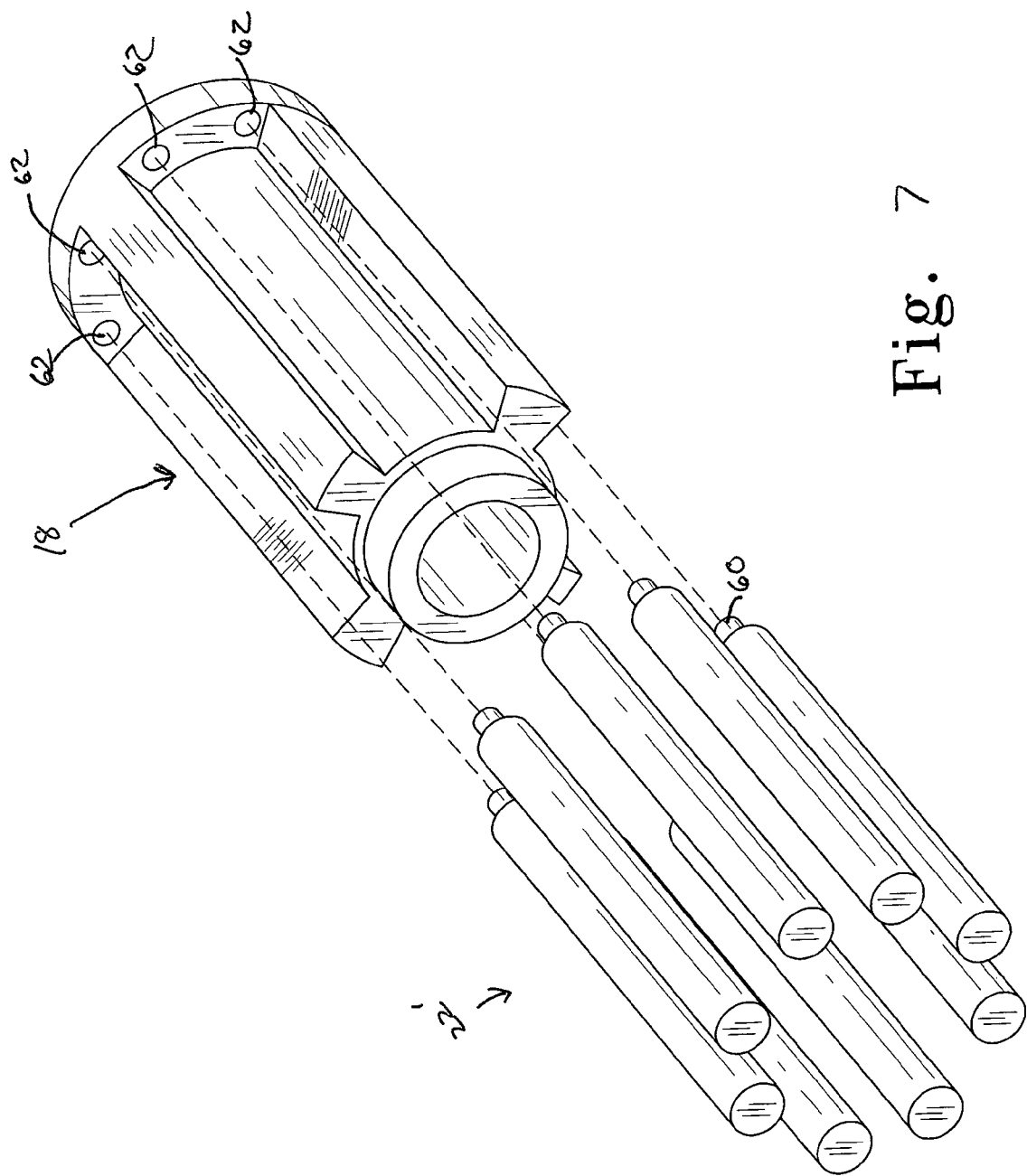
FIG. 7 is an exploded view of the resilient members and drive member shown in FIGS. 5–6.
Figure 8:
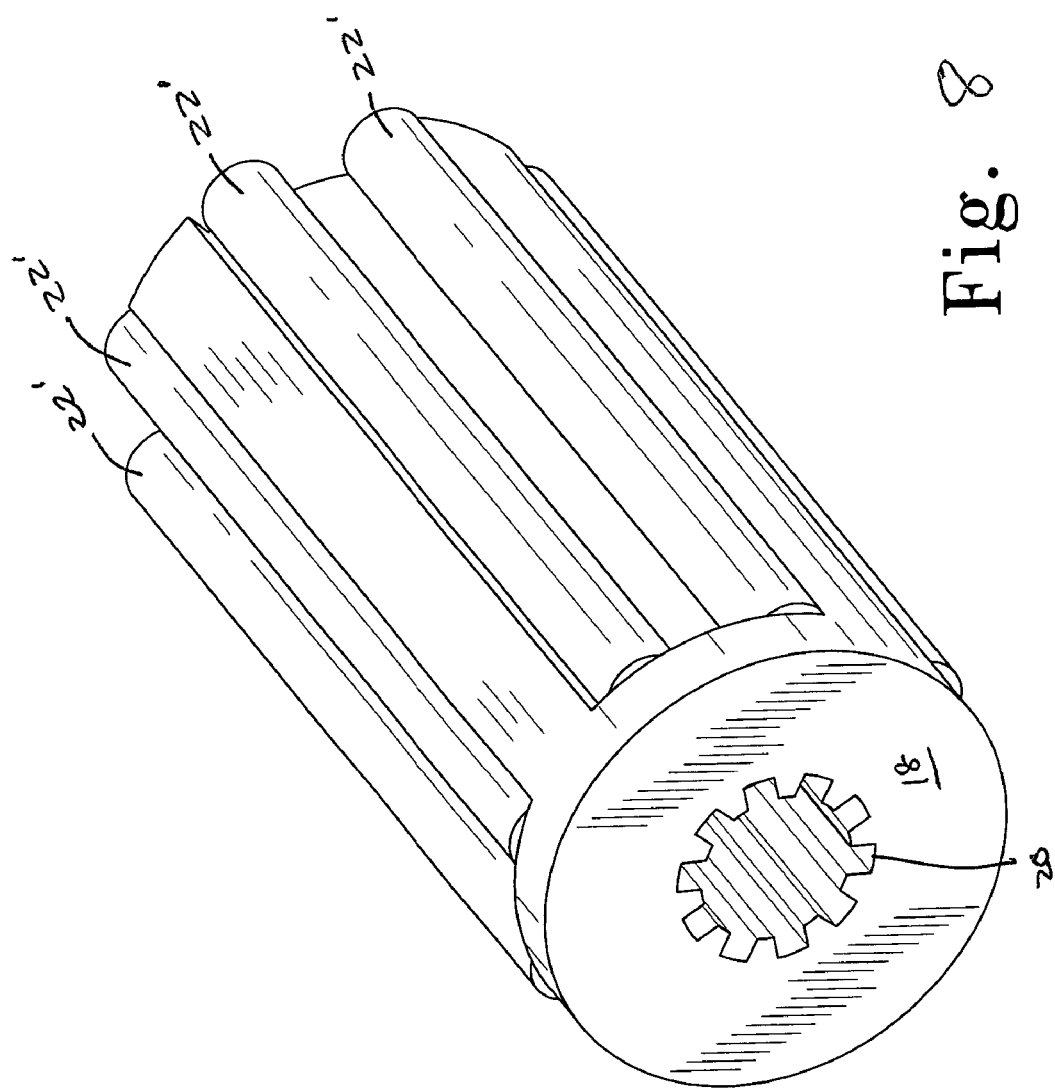
FIG. 8 is a perspective view of the resilient members and drive member, similar to that of FIG. 6, showing the resilient members positioned on the drive member.
Figure 9:
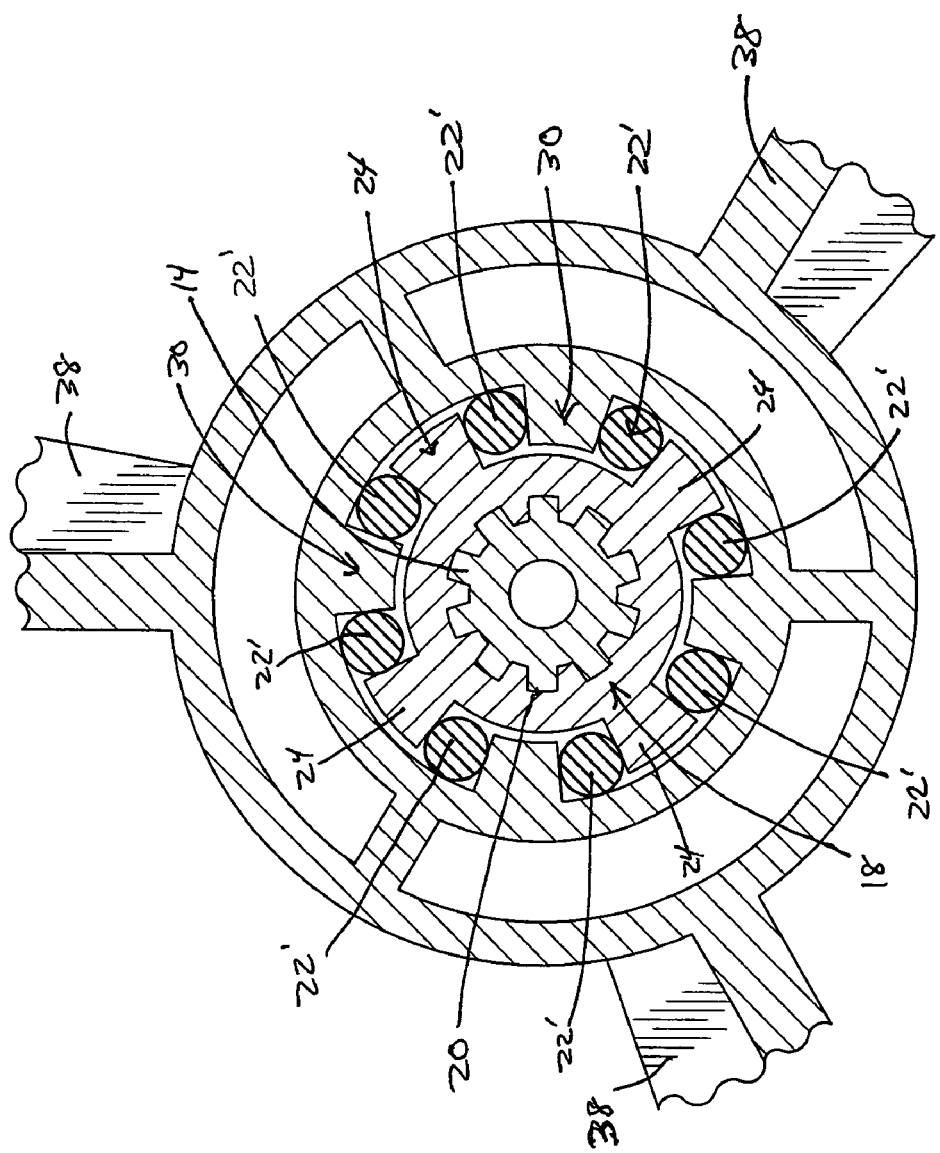
FIG. 9 is a cross-sectional view of the assembled embodiment of FIGS. 5–8, looking toward the bow of the boat.

As mentioned above, resilient members 22 can have alternative constructions, including alternative cross sections. For example, resilient members can be formed substantially cylindrically, such as can be seen in FIGS. 5–9. In such an embodiment, propeller assembly 10 and its components are constructed in a similar fashion as that described above, except resilient members 22', having generally circular cross-sections as can be seen in FIGS. 5–9, are substituted for resilient members 22 of FIGS. 1–4. Illustratively, resilient members 22' are formed with bosses 60, as shown in FIGS. 6–7, for insertion in cavities 62 of drive member 18.

Figure 10:
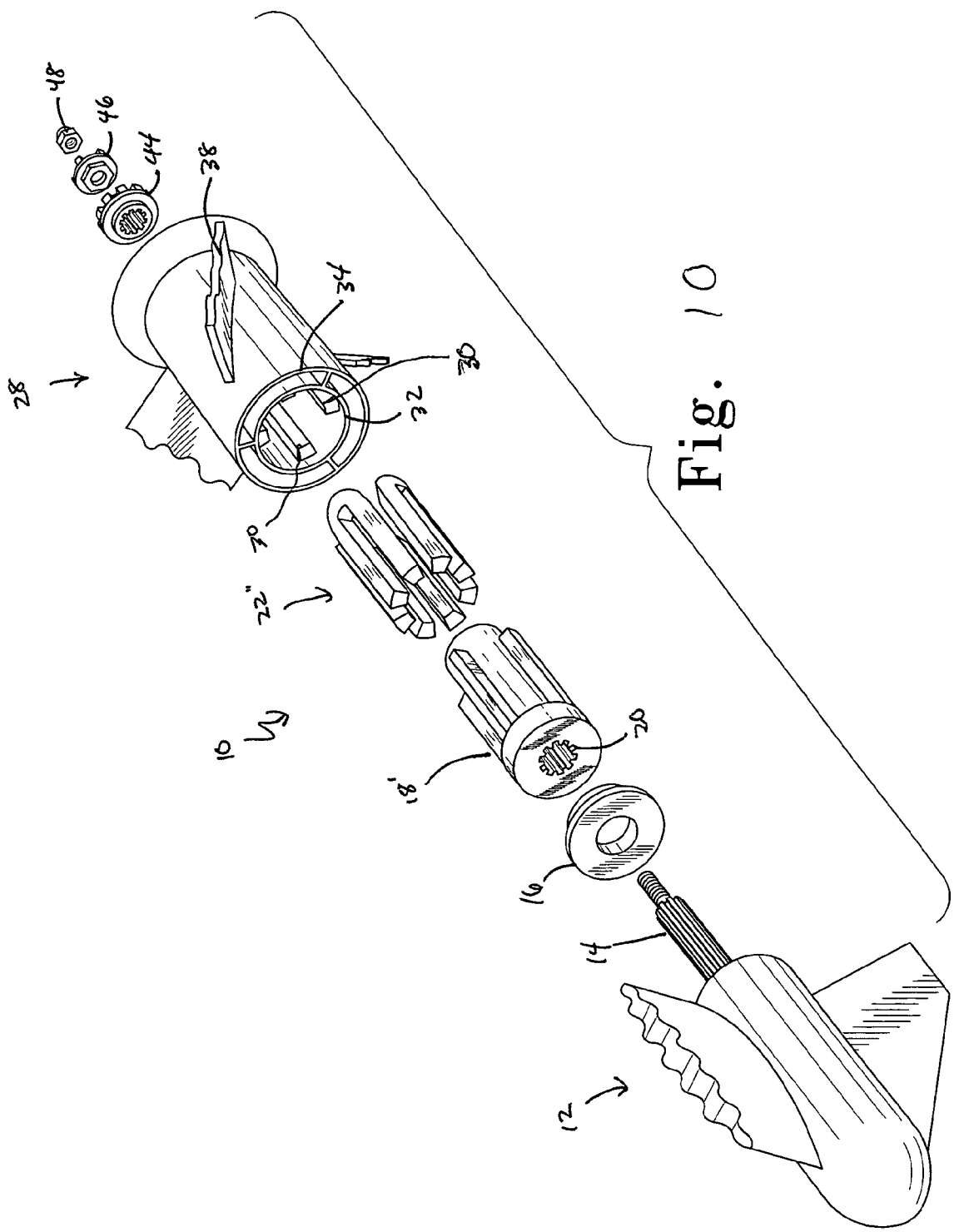
FIG. 10 is an exploded view of a propeller assembly similar to that of FIGS. 1 and 5, showing yet another embodiment of the present disclosure having U-shaped resilient members.
Figure 11:
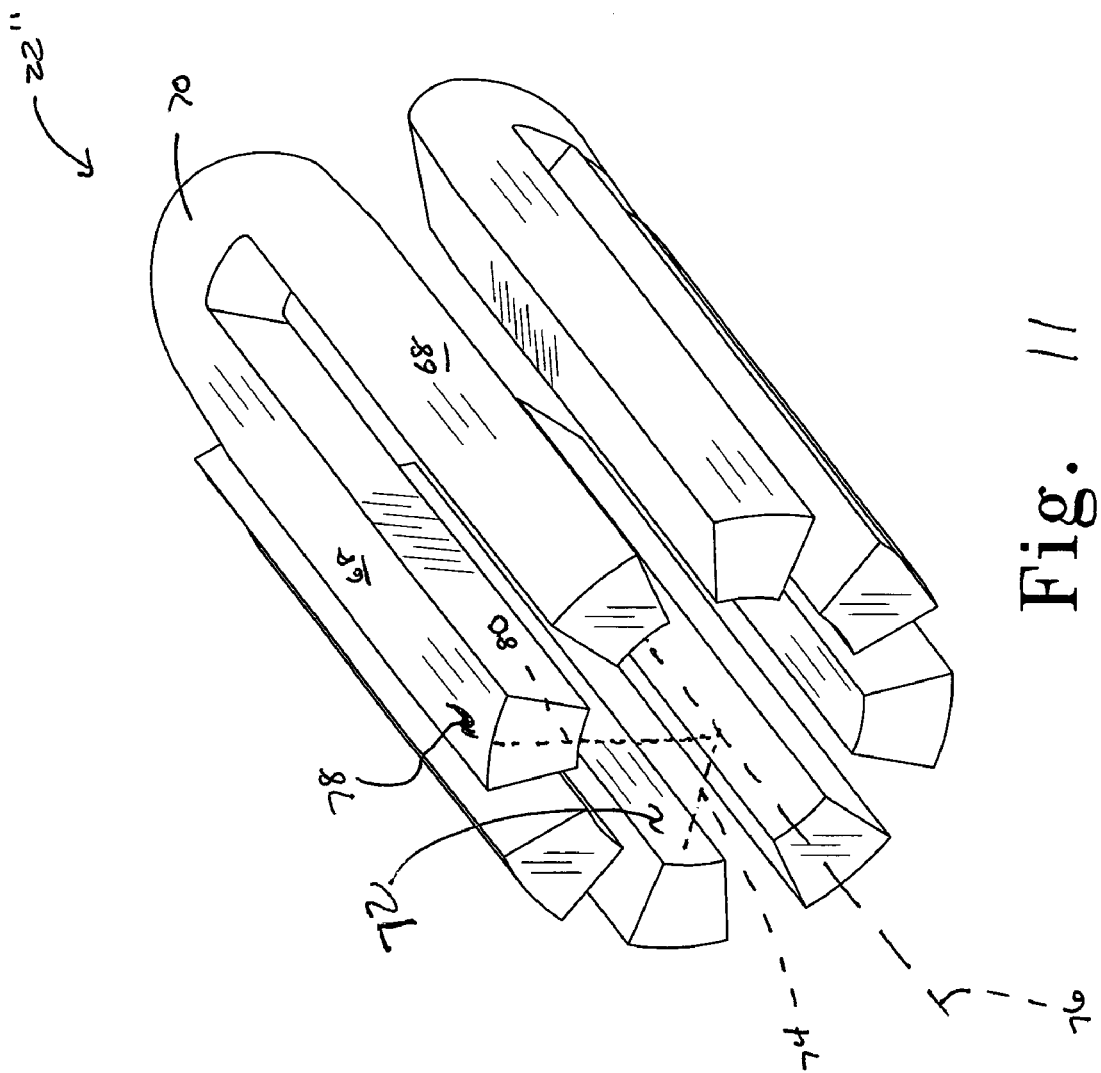
FIG. 11 is a perspective view of the U-shaped resilient members of the embodiment shown in FIG. 10.
Figure 12:
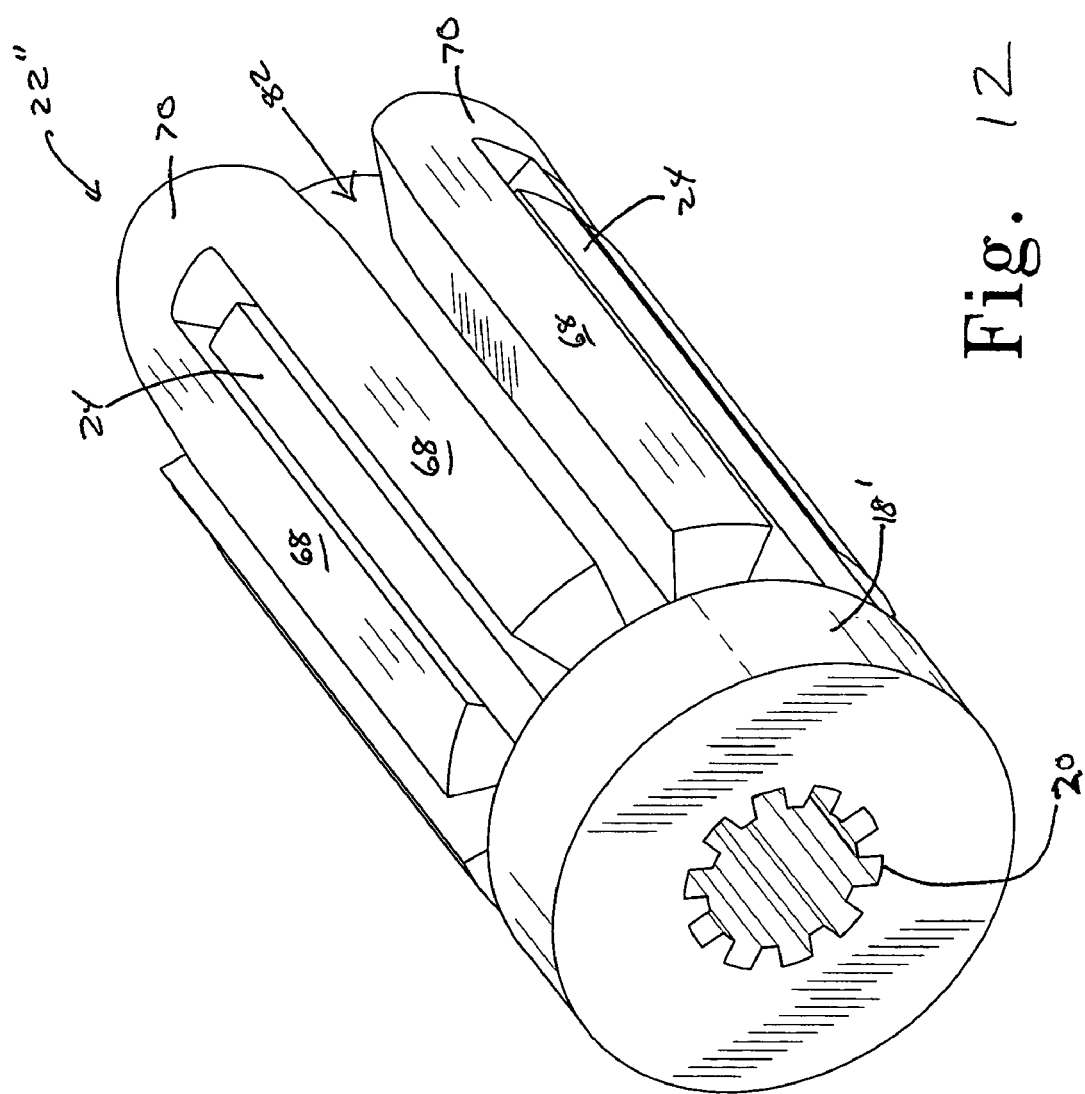
FIG. 12 is a perspective view of the U-shaped resilient members of FIGS. 10–11 positioned on the drive member.
Figure 13:
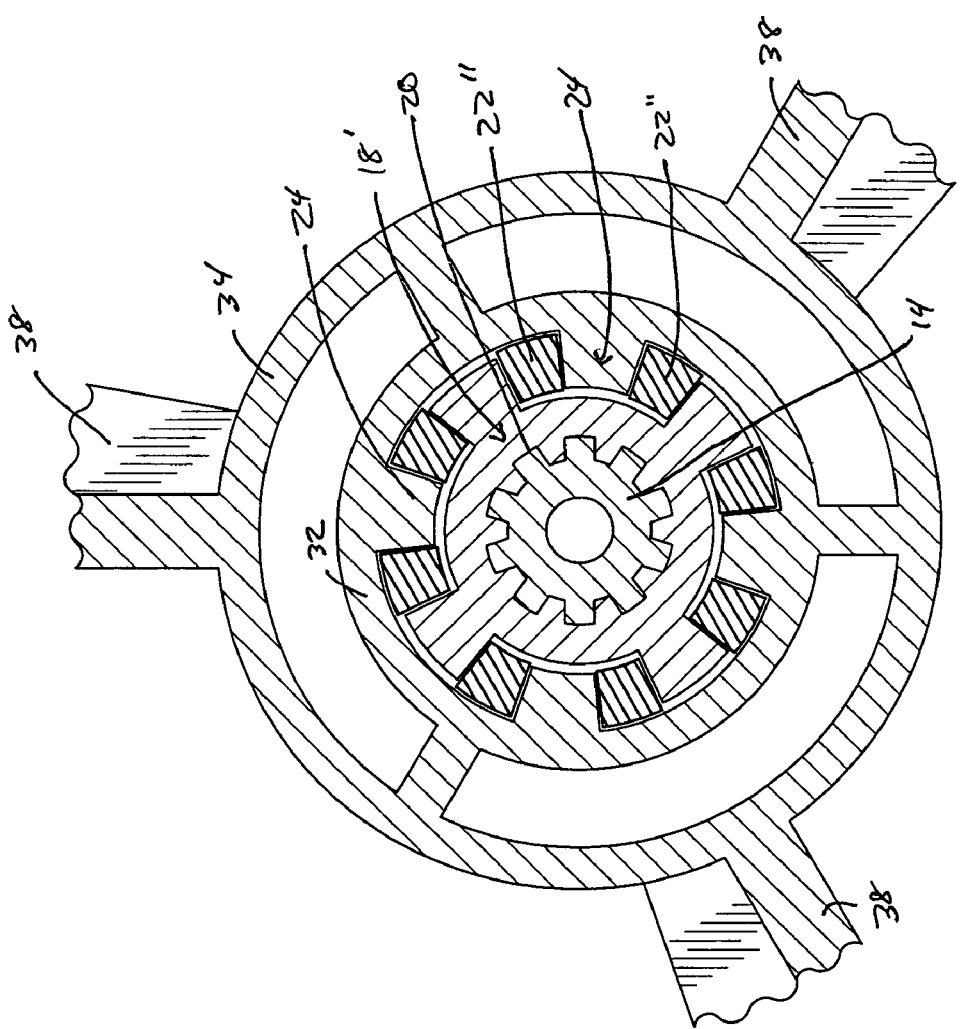
FIG. 13 is a cross-sectional view of the assembled embodiment of FIGS. 10–12, looking toward the bow of the boat.

FIGS. 10–13 show yet another embodiment of propeller assembly 10. As can be seen in FIGS. 10–12, resilient members 22" are substantially U-shaped members, each having two appendages 68 connected by a loop portion 70. Such appendages 68 and connecting loop portions 70 are illustratively formed of rubber having a hardness in the range of, but not limited to, 30 to 100 durometer on the Shore A-scale. Again, resilient members 22" are illustratively shown to have a polygon cross-section as described above and shown in FIGS. 3–4. However, it is within the scope of the disclosure to form resilient members 22" such that the cross section resembles any shape, including a square, triangle, cylinder, or oval. Resilient members 22" may also include rounded edges.

Resilient members 22" are illustratively formed to hold the U-shape shown in FIG. 11, facilitating the assembly of propeller assembly 10. Furthermore, radially inwardly facing surfaces 72 of resilient members 22" are formed to have a radius of curvature 74 about axis 76. Illustratively, axis 76 is coaxial with the axes of propeller shaft 14, drive member 18, and propeller 28.

Resilient members 22" further include a radially outwardly facing surface 78. Such surface 78 is also illustratively formed to have a radius of curvature 80 about axis 76, as can be seen in FIG. 11. It should be understood that although the illustrated embodiments include radiused surfaces 74, 78, other configurations are within the scope of the disclosure.

After resilient members 22" are positioned to embrace radially outwardly extending ribs 24 of drive member 18', as shown in FIG. 12, drive member 18', carrying resilient members 22", can be inserted into inner hub 32 of propeller 28 such that each radially inwardly extending rib 30 is positioned in a space 82 formed between appendages 68 of two adjacent resilient members 22".

Figure 14:
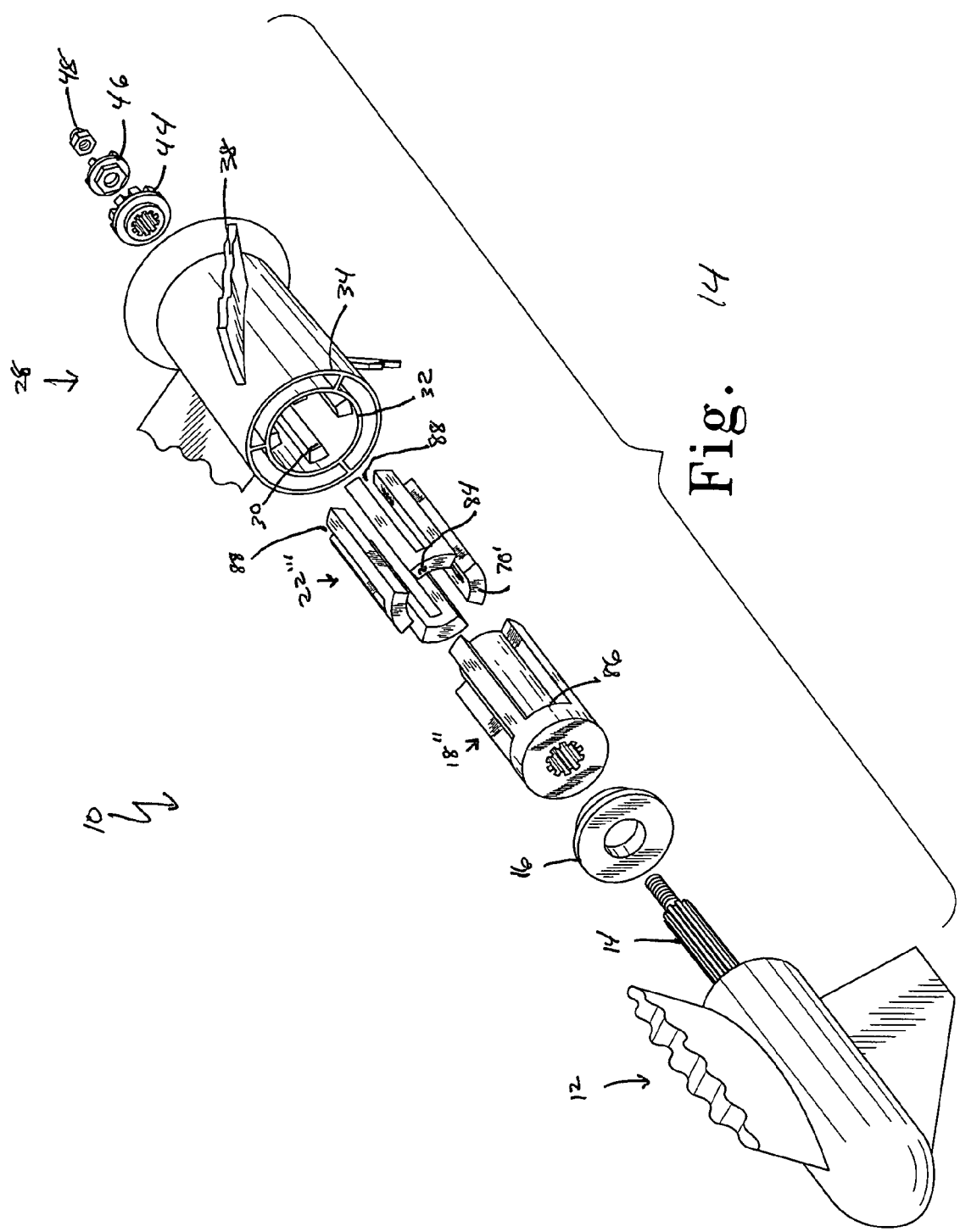
FIG. 14 is an exploded view of a propeller assembly showing still another embodiment of the present disclosure, wherein the U-shaped resilient members are configured to be positioned in the U-shaped recesses of the drive member.
Figure 15:
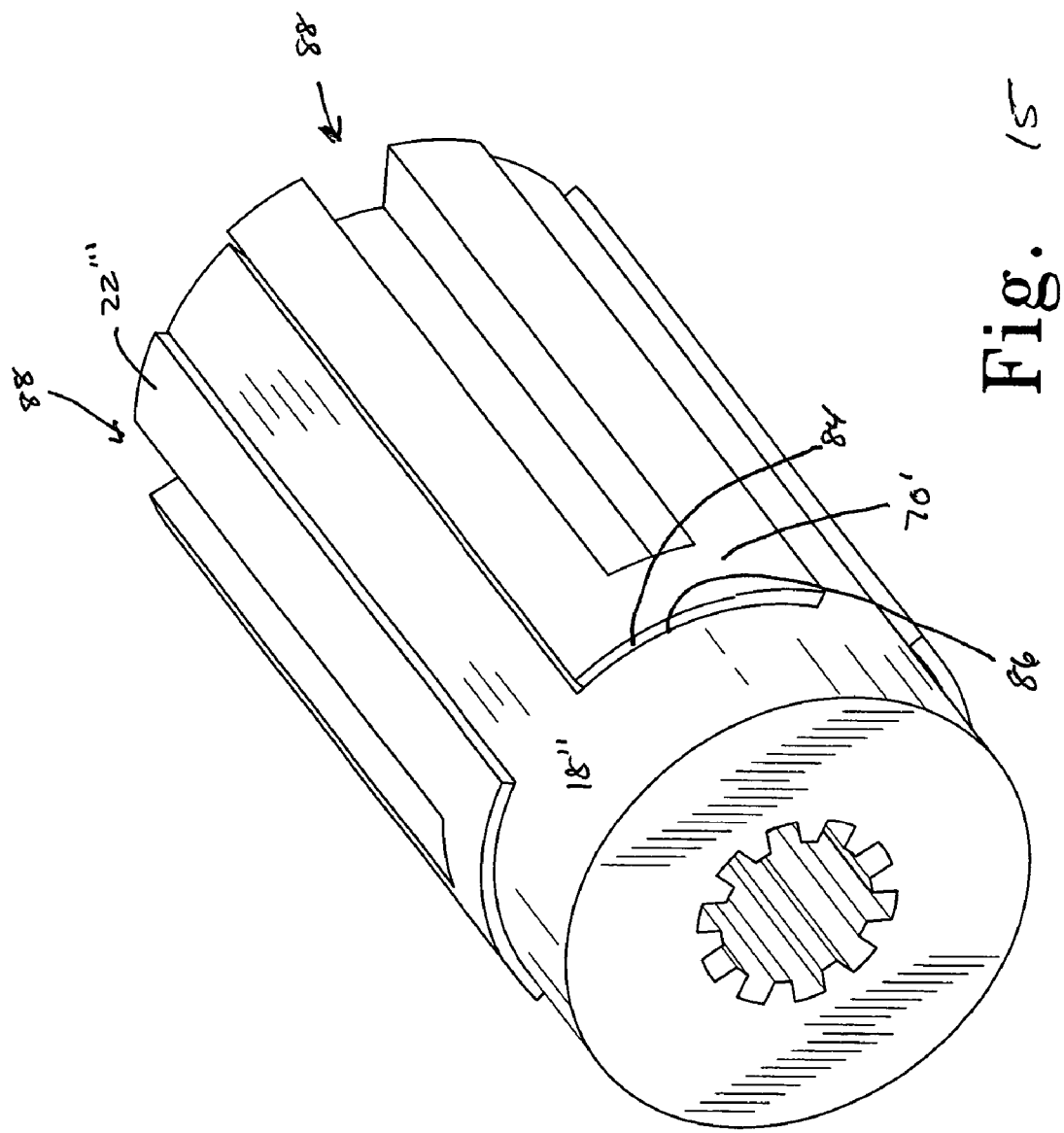
FIG. 15 is a perspective view of the U-shaped resilient members positioned in the recesses of the drive member.

FIGS. 14–15 represent yet another embodiment of a propeller assembly 10, showing a drive member 18" that is configured to receive loop portions 70' of resilient members 22'". Illustratively, loop portions 70' have a flat end surface 84 configured to mate with flat channel end 86, as can be seen in FIGS. 14–15. Such a configuration positions open ends 88 of resilient members 22'" for engagement with radially inwardly extending ribs 30 of propeller 28, as can be seen in FIG. 14.

Figure 16:
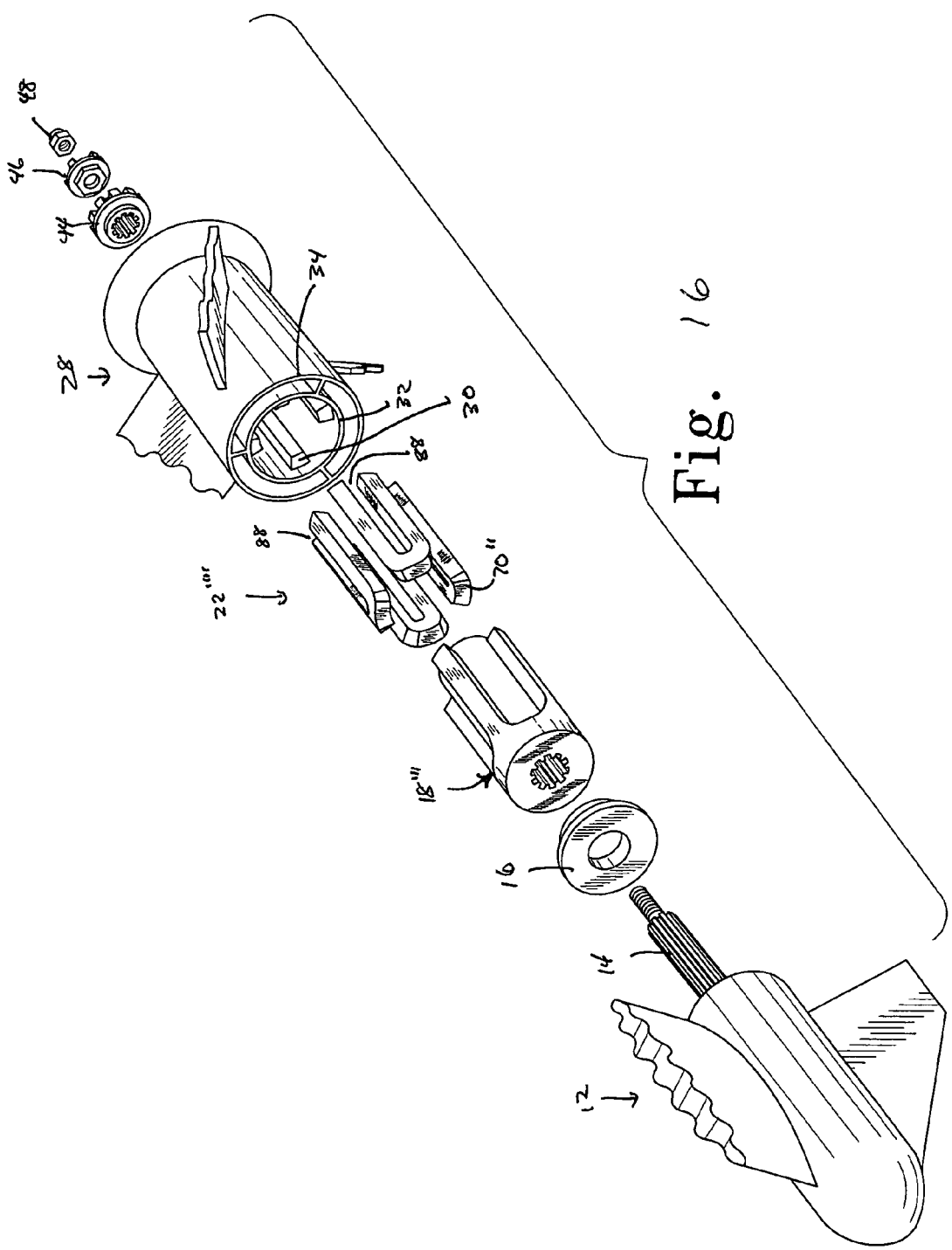
FIG. 16 an exploded view of a propeller assembly showing a further embodiment of the present disclosure, wherein the U-shaped resilient members are configured to have rounded shoulders.
Figure 17:
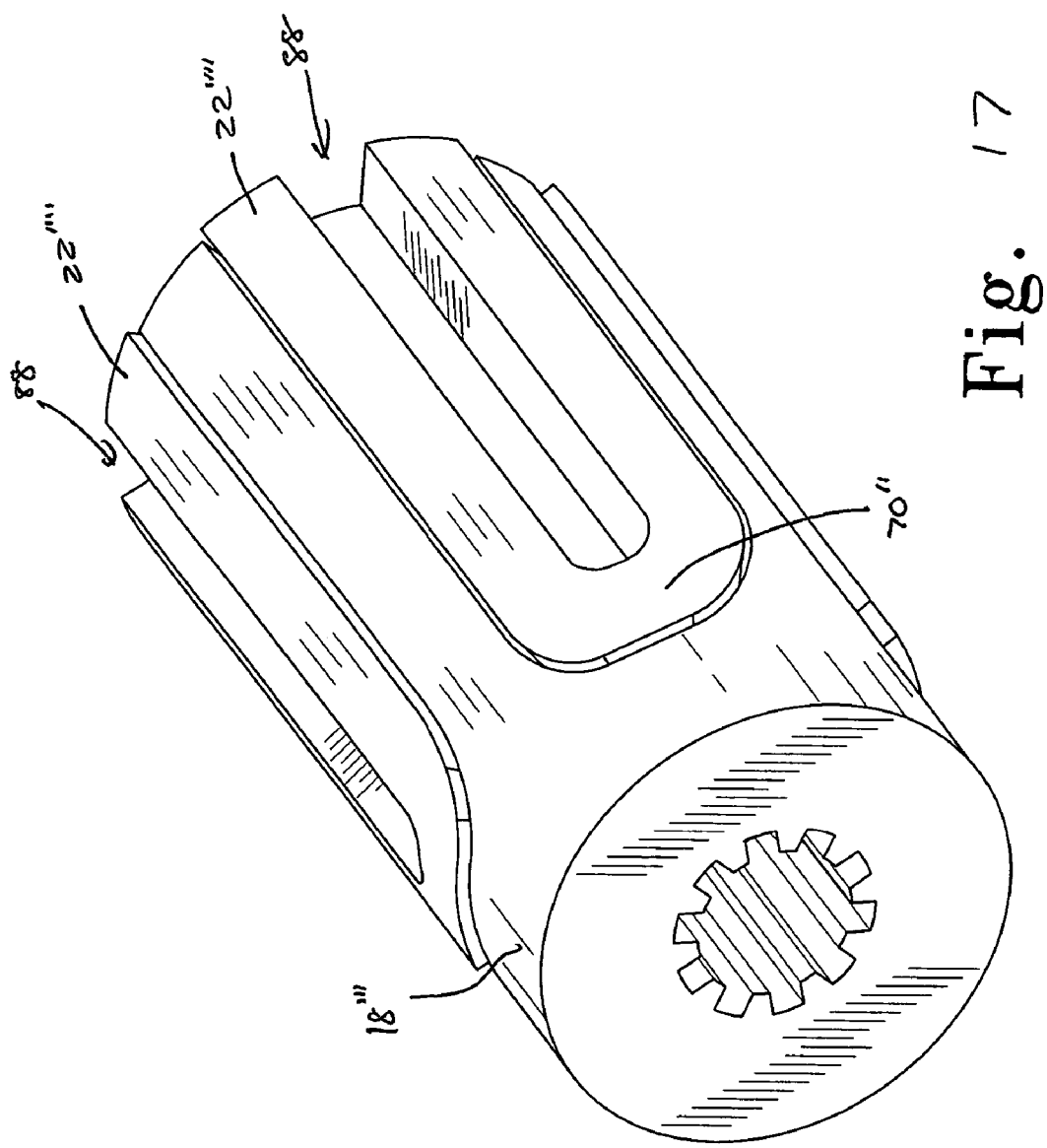
FIG. 17 is a perspective view showing the U-shaped resilient members of FIG. 16 positioned on the drive member of FIG. 16.

FIGS. 16–17 illustrate still another embodiment of a propeller assembly 10, showing a drive member 18'" that is configured to receive rounded loop portions 70" and position open ends 88 of resilient members 22"" similarly to that shown in FIGS. 14–15 so that radially inwardly extending ribs 30 are inserted through the openings of open ends 88.

Advantageously, the illustrated embodiments of resilient members 22 do not require press-fitting in order to install resilient members 22 in their proper place. In some prior art embodiments of a shock-absorbing coupling system, as much as eight tons of force was needed to press-fit a propeller on a shock-absorbing coupling system. The presently disclosed embodiment permits on-water service to be performed, eliminating the need for press-fitting tools and equipment.

Figure 18:
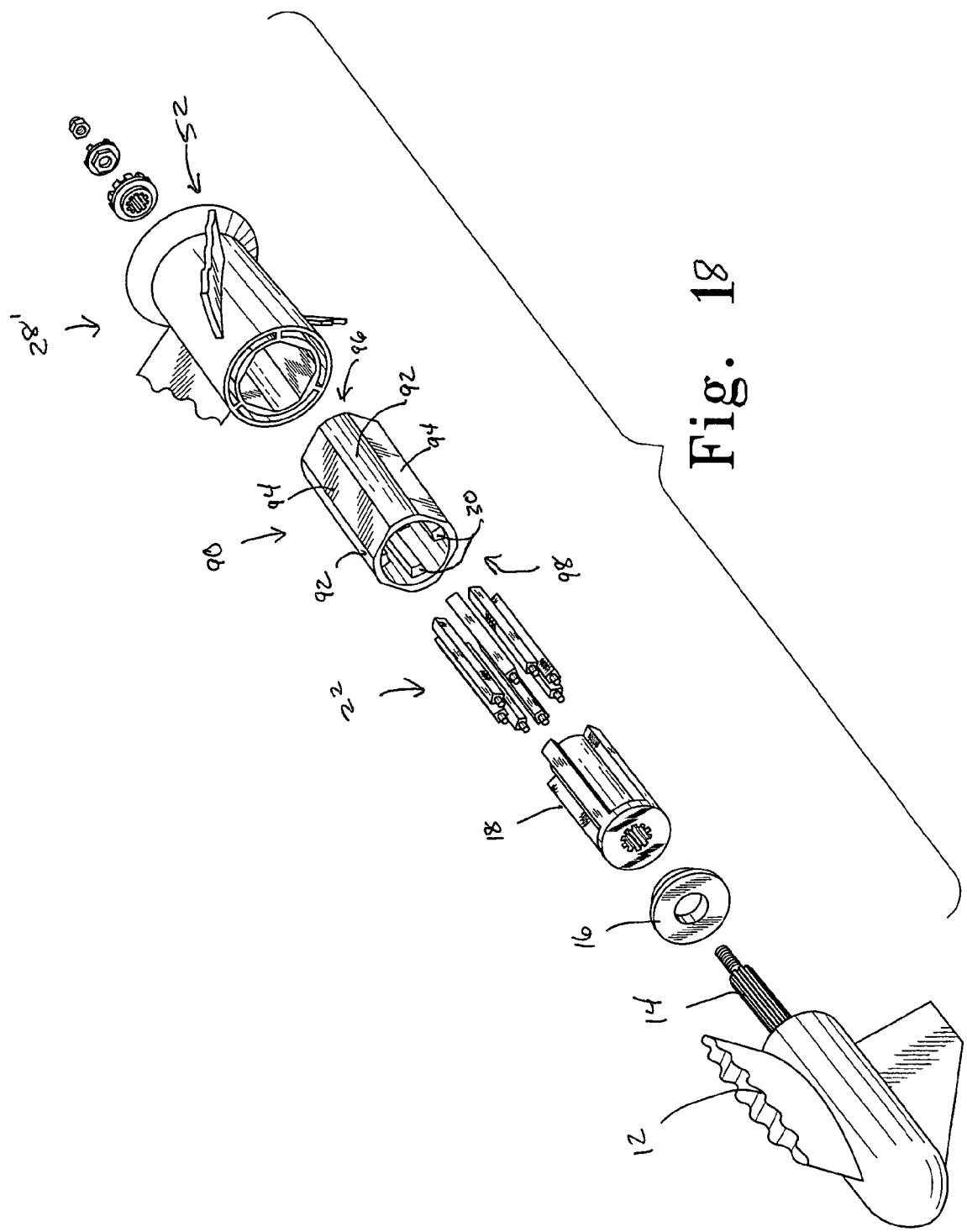
FIG. 18 is an exploded view of another propeller assembly showing an embodiment of the disclosure wherein a substantially squared insert is positioned between the propeller hub and the drive member.
Figure 19:
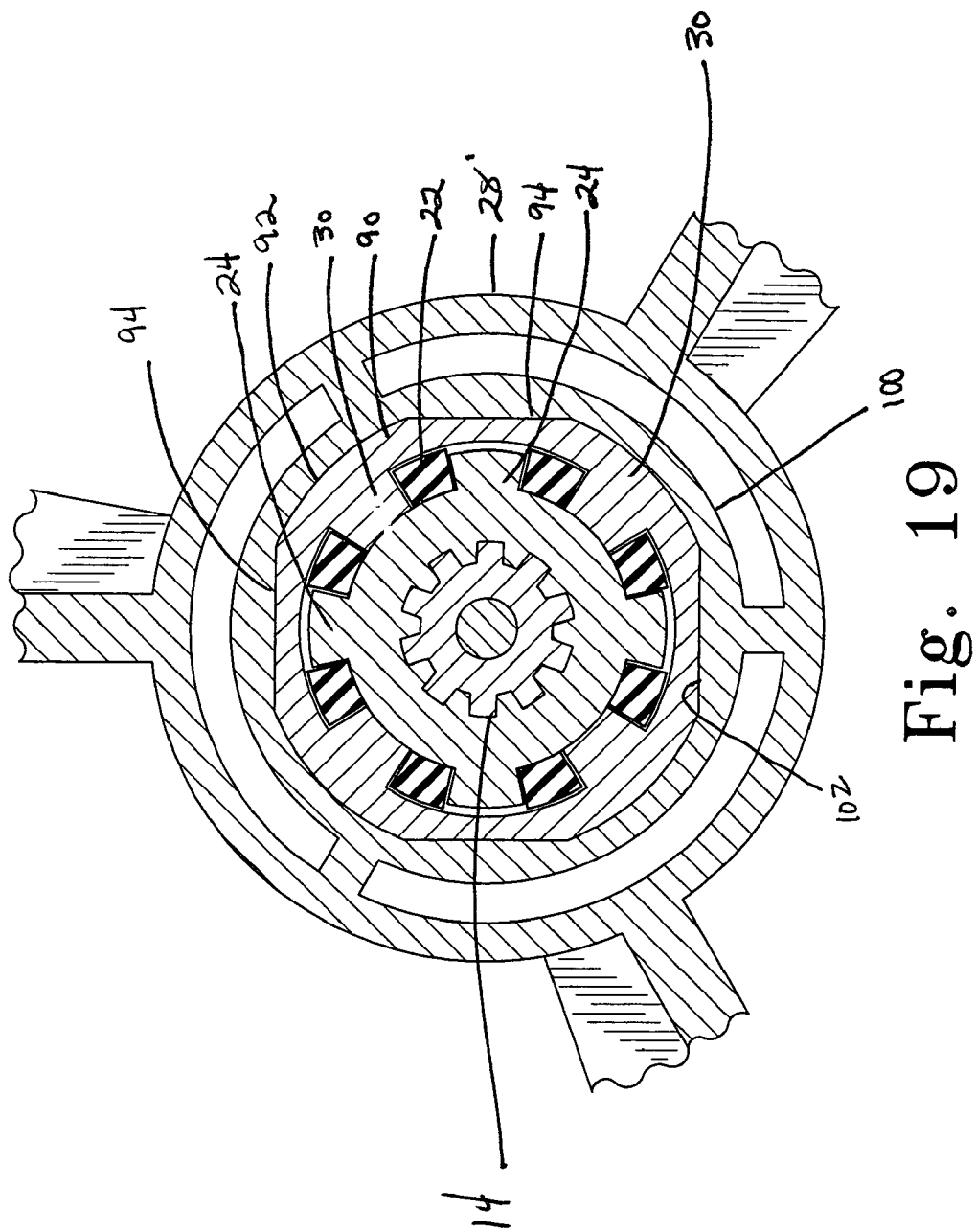
FIG. 19 is a cross-sectional view of the assembled embodiment shown in FIG. 18.

Yet another embodiment is shown in FIGS. 18–19, wherein an insert 90 is positioned between drive member 18 and a modified propeller 28'. Illustratively, insert 90 has four sides 94 forming a substantially square-shaped cross-section, as can be seen in FIGS. 18–19. Corners 92 between each side 94 are illustratively rounded. In such an embodiment, distal end 96 of insert 90 is machined to have a slightly smaller dimension than proximal end 98, and propeller 28' is machined in an identical and complimentary fashion, thereby facilitating the mating of propeller 28' with insert 90. It should be understood that insert 90 could also be constructed to mate with propeller 28 from stem end 52 of propeller 28', thereby necessitating distal end 96 to be dimensioned larger than proximal end 98, and propeller 28' to be similarly constructed.

Insert 90 is illustratively made of copper or any other water-resistant hardened material, and resilient members 22 are positioned between radially inwardly extending tabs 30 of insert 90 and radially outwardly extending tabs 24 of drive member 18, in a manner similar to that described above for other embodiments. It should be understood that although resilient members 22 are shown embodied similarly to that shown in FIGS. 1–4, other embodiments such as those described above are within the scope of this embodiment.

As illustratively shown in FIG. 19, inner hub 32' of propeller 28' has a substantially cylindrical outer surface 100, and an inner surface 102 that is configured to mate with and engage sides 94 and rounded corners 92 of insert 90.

A propeller 28' constructed as shown in FIG. 19 is known in the art and can be purchased from Mercury Marine and other propeller manufacturers. Insert 90, when used in conjunction with propeller 28', provides the advantage of shock absorption qualities, as discussed in the other embodiments above, while insert 90 is manufactured from a durable and water-resistant material such as copper.

A method of resiliently connecting a drive axle to a propeller is also disclosed. The method comprises the steps of mounting a drive member on the drive axle; positioning a plurality of resilient members adjacent an outer surface of the drive member, each resilient member also being adjacent one of the radially outwardly extending ribs; mating a boss end of each resilient member in a cavity formed in the drive member; and positioning the propeller over the resilient members. Each of the resilient members has a radially inwardly facing surface that is contoured to embrace the cylindrical outer surface of the drive member. Each resilient member also has a first side contact surface for contacting one of either an inwardly extending rib or an outwardly extending rib.

According to the disclosure, the resilient members are formed to deflect under torsion delivered by either the propeller or the drive member. The resilient members also permit limited movement of the propeller relative to the drive member.

Although the invention has been described in detail with reference to preferred embodiments, additional variations and modifications exist within the scope and spirit of the invention as described and defined in the following claims.

What is claimed:

1. An assembly for connecting a propeller to a drive axle, the assembly comprising
    a drive member configured to mount on the drive axle, the drive member having an axis and including a plurality of radially outwardly extending ribs,
    a tubular member coupled to the propeller, the tubular member having an axis and a plurality of radially inwardly extending ribs, and
    a plurality of U-shaped resilient members, each resilient member having two appendages, each appendage extending between one of the plurality of radially outwardly extending ribs and one of the plurality of radially inwardly extending ribs.

2. The assembly of claim 1, wherein each radially outwardly extending rib includes a drive surface, the drive surface defining a plane in radial alignment with the drive member axis.

3. The assembly of claim 2, wherein the appendage comprises a contact surface configured to engage the drive surface of the radially outwardly extending rib.

4. The assembly of claim 3, wherein the contact surface defines a plane in radial alignment with the drive member axis.

5. The assembly of claim 2, wherein each radially outwardly extending rib further includes a counter-drive surface, the counter-drive surface also defining a plane in radial alignment with the drive member axis.

6. The assembly of claim 5, wherein the appendage comprises a counter-drive contact surface configured to engage the counter-drive surface of the radially outwardly extending rib.

7. The assembly of claim 6, wherein the counter-drive contact surface defines a plane in radial alignment with the drive member axis.

8. The assembly of claim 1, wherein each appendage defines an longitudinal axis, the longitudinal axis being in parallel alignment with the drive member axis.

9. The assembly of claim 1, wherein each appendage has a length that is substantially equal to the axial length of the inwardly extending ribs.

10. The assembly of claim 1, wherein each U-shaped resilient member has a loop portion connecting the two appendages.

11. The assembly of claim 10, wherein the looped portion is arcuately shaped.

12. An assembly for connecting a propeller to a drive axle, the assembly comprising
    a drive member configured to mount on the drive axle, the drive member having an axis, a plurality of coupling portions and a plurality of radially outwardly extending ribs,
    a tubular member coupled to the propeller, the tubular member having an axis and a plurality of radially inwardly extending ribs, and
    a plurality of resilient members, each resilient member being positioned between one of the plurality of radially outwardly extending ribs and one of the plurality of radially inwardly extending ribs, the resilient members each having a coupling portion configured to engage an associated coupling portion of the drive member.

13. The assembly of claim 12, wherein planar contact surface is in radial alignment with the drive member axis.

14. The assembly of claim 12, wherein the planar counter-drive surface is in radial alignment with the drive member axis.

15. The assembly of claim 12, wherein each of the plurality of resilient members has a longitudinal axis in parallel alignment with the drive member axis.

16. A method of resiliently connecting a propeller to a drive axle, the method comprising the steps of
    mounting a drive member on the drive axle, the drive member having an axis and a cylindrical outer surface having a plurality of radially outwardly extending ribs extending therefrom,
    positioning a plurality of resilient members adjacent the outer surface, each resilient member being positioned adjacent one of the radially outwardly extending ribs,
    mating a boss end of each resilient member in a cavity formed in the drive member, and
    positioning the propeller over the resilient members, the propeller having a concentric tubular member defining an axis and a plurality of radially inwardly extending ribs, wherein each of the radially inwardly extending ribs is configured to extend between two of the resilient members.

17. The method of claim 16, wherein each of the resilient members has a radially inwardly facing surface contoured to embrace the cylindrical outer surface of the drive member.

18. The method of claim 16, wherein each of the resilient members has a first side contact surface for contacting one of the inwardly extending ribs and the outwardly extending ribs, the side contact surface having a plane in radial alignment with the propeller drive axle.

19. An assembly for connecting a propeller to a drive axle, the propeller including an inner hub having a plurality of inwardly-facing surfaces, the assembly comprising
    a drive member configured to mount on the drive axle, the drive member having an axis and including a plurality of radially outwardly extending ribs,
    an insert having a plurality of outwardly-facing surfaces configured to engage associated inwardly-facing surfaces of the inner hub of the propeller when the insert is mated with the propeller, the insert having an axis and a plurality of radially inwardly extending ribs, and
    a plurality of resilient members, each resilient member extending between one of the plurality of radially outwardly extending ribs and one of the plurality of radially inwardly extending ribs.

20. A method of resiliently connecting a propeller to a drive axle, the method comprising the steps of
    mounting a drive member on the drive axle, the drive member having an axis and a cylindrical outer surface having a plurality of radially outwardly extending ribs extending therefrom,
    positioning a plurality of resilient members adjacent the outer surface, each resilient member being positioned adjacent one of the radially outwardly extending ribs, mating a boss end of each resilient member in a cavity formed in the drive member, mating an insert with an inner hub of the propeller, the insert having a plurality of radially inwardly extending ribs, wherein each of the radially inwardly extending ribs is configured to extend between two of the resilient members.

21. The assembly of claim 12, wherein each coupling portion of the drive member comprises a boss-receiving cavity, and each coupling portion of the resilient member comprises a boss configured to be received in an associated boss-receiving cavity in the drive member.

* * * * *